United States Patent
Lim et al.

(10) Patent No.: US 10,515,440 B2
(45) Date of Patent: Dec. 24, 2019

(54) DISPLAY APPARATUS AND IMAGE PROCESSING METHOD THEREOF

(71) Applicant: SAMSUNG ELECTRONICS CO., LTD., Suwon-si (KR)

(72) Inventors: Hyung-jun Lim, Seoul (KR); Seok-bong Yoo, Suwon-si (KR); Tae-gyoung Ahn, Yongin-si (KR); Young-su Moon, Seoul (KR); Seong-hoon Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/027,611

(22) Filed: Jul. 5, 2018

(65) Prior Publication Data
US 2019/0066274 A1     Feb. 28, 2019

(30) Foreign Application Priority Data

Aug. 30, 2017     (KR) .................. 10-2017-0110249

(51) Int. Cl.
| | | |
|---|---|---|
| *G06T 5/00* | (2006.01) | |
| *G06T 7/13* | (2017.01) | |
| *G09G 3/20* | (2006.01) | |
| *G06T 3/40* | (2006.01) | |
| *H04N 7/01* | (2006.01) | |

(52) U.S. Cl.
CPC ............ *G06T 5/003* (2013.01); *G06T 3/4053* (2013.01); *G06T 3/4061* (2013.01); *G06T 7/13* (2017.01); *G09G 3/2096* (2013.01); *H04N 7/0117* (2013.01); *G09G 2320/029* (2013.01); *G09G 2340/16* (2013.01)

(58) Field of Classification Search
None
See application file for complete search history.

(56) References Cited

U.S. PATENT DOCUMENTS

| | | |
|---|---|---|
| 8,203,613 B2 | 6/2012 | Furukawa |
| 8,687,913 B2 | 4/2014 | Lin |
| (Continued) | | |

FOREIGN PATENT DOCUMENTS

| | | |
|---|---|---|
| JP | 2008-067315 A1 | 3/2008 |
| JP | 2013512472 A | 4/2013 |
| (Continued) | | |

OTHER PUBLICATIONS

Communication dated Aug. 8, 2018, issued by the European Patent Office in counterpart European Application No. 18181770.1.
(Continued)

*Primary Examiner* — Vu Nguyen
(74) *Attorney, Agent, or Firm* — Sughrue Mion, PLLC

(57) ABSTRACT

A display apparatus is provided. The display apparatus includes an input interface, a first storage, a display, and a processor. Pixel values corresponding to a predetermined number of lines in an image input through the input interface are stored in the first storage. The processor acquires a first patch of a predetermined size by sampling a number of pixel values located in an outer region of a matrix centering about a specific pixel value from among the pixel values stored in the first storage, acquires a high-frequency component for the specific pixel value based on the acquired first patch, and processes the input image based on the high-frequency component. The display displays the processed image.

20 Claims, 22 Drawing Sheets

(56) References Cited

U.S. PATENT DOCUMENTS

| | | |
|---|---|---|
| 9,349,188 B2 | 5/2016 | Tao et al. |
| 2004/0080631 A1 | 4/2004 | Tominaga et al. |
| 2009/0153683 A1 | 6/2009 | Furukawa |
| 2013/0034271 A1 | 2/2013 | Sakaguchi et al. |
| 2013/0038758 A1 | 2/2013 | Imade |
| 2013/0071040 A1 | 3/2013 | Jin et al. |
| 2015/0213581 A1 | 7/2015 | Lee |
| 2016/0295115 A1 | 10/2016 | Hjelmström et al. |

FOREIGN PATENT DOCUMENTS

| | | |
|---|---|---|
| JP | 5341010 B2 | 11/2013 |
| KR | 10-2000-0062277 A | 10/2000 |
| KR | 1020030075169 A | 9/2003 |
| KR | 100436904 B1 | 6/2004 |
| KR | 1020160118947 A | 10/2016 |
| WO | 98/28917 A1 | 7/1998 |
| WO | 2011067699 A1 | 6/2011 |
| WO | 2015/182910 A1 | 12/2015 |

OTHER PUBLICATIONS

International Search Report (PCT/ISA/210) dated Oct. 11, 2018 issued by the International Searching Authority in International Application No. PCT/KR2018/007970.

Written Opinion (PCT/ISA/237) dated Oct. 11, 2018 issued by the International Searching Authority in International Application No. PCT/KR2018/007970.

Kim et al, "Image Enhancement and Post-processing for Low Resolution Compressed Video", Jun. 2011, IEEK Summer Conference 2011, pp. 906-909 (6 pages total).

Shi et al., "Spatially Scalable Video Coding for HEVC", Dec. 2012, IEEE Transactions on Circuits and Systems for Video Technology, vol. 22, No. 12, pp. 1813-1826 (15 pages total).

Freeman et al., "Example-Based Super-Resolution", Mar. 1, 2002, IEEE Service Center, vol. 22, No. 2, pp. 56-65 (10 pages total).

Barnes et al., "The Generalized Patch Match Correspondence Algorithm", Sep. 5, 2010, Computer Vision—ECCV 2010, pp. 29-43 (15 pages total).

Kawano, et al. "Image Enlargement with High-Frequency Component Augmentation Based on Predefined Codebook Describing Edge Blurring Properties", Oct. 1, 2010, Optical Review, vol. 17, No. 5, pp. 447-453 (7 pages total).

Huang et al., "Single Image Super-resolution from Transformed Self-Exemplars", Jun. 7, 2015, 2015 IEEE Conference on Computer Vision and Pattern Recognition, pp. 5197-5206 (10 pages total).

Freedman et al., "Image and Video Upscaling from Local Self-Examples" Apr. 22, 2011Q239884, ACM Transactions on Graphics. vol. 30, No. 2, pp. 1-11 (11 pages total).

Yue Zhuo et al., "Nonlocal based super resolution with rotation invariance and search window relocation", 2012 IEEE International conference on acoustics, speech and signal processing (ICASSP 2012), Kyoto, Japan, XP032227261, IEEE, Mar. 25, 2012, pp. 853-856.

Communication dated Mar. 8, 2019, issued by the European Patent Office in counterpart European Application No. 18 181 770.1.

FIG. 9A
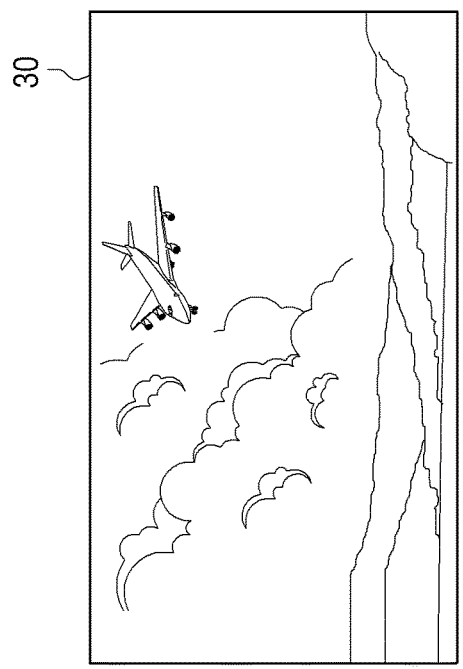
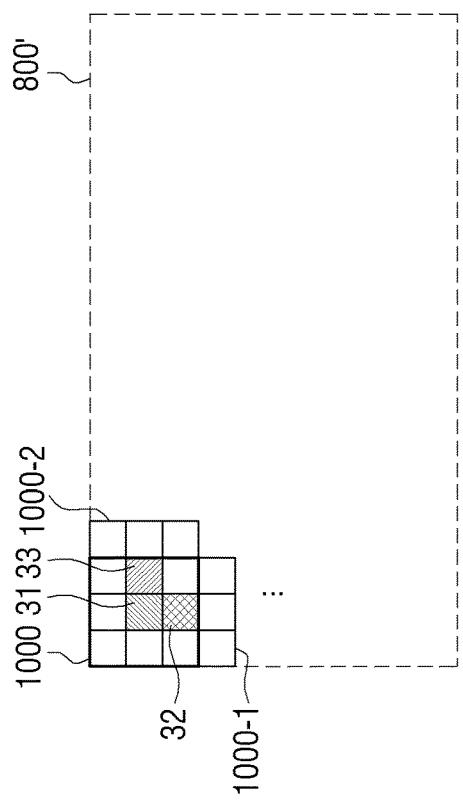

DISPLAY APPARATUS AND IMAGE PROCESSING METHOD THEREOF

CROSS-REFERENCE TO RELATED APPLICATIONS

This application claims is based on and claims priority under 35 U.S.C. § 119 to Korean Patent Application No. 10-2017-0110249, filed on Aug. 30, 2017, in the Korean Intellectual Property Office, the disclosure of which is incorporated herein by reference in its entirety.

BACKGROUND

Field

The disclosure relates to a display apparatus and a control method thereof, and more particularly, to a display apparatus which restores a high-frequency component of an input image and an image processing method thereof.

Description of the Related Art

With the development of electronic technology, various types of electronic apparatuses have been developed and spread. Display apparatuses, used in various places such as a home, an office, a public place, and the like, have been increasingly developed in recent years.

In recent years, high-definition display panels such as 4K UHD television (TV) have emerged and are widely spread. However, high-quality and high definition content may be considerably insufficient. Therefore, there is a need for various techniques for generating high-definition content from low-definition content. Further, the high-frequency components of the content may be lost due to image compression such as MPEG/H.264/HEVC. Therefore, there is a need for technology for restoring the lost high-frequency component.

The above information is presented as background information only to assist with an understanding of the present disclosure. No determination has been made, and no assertion is made, as to whether any of the above might be applicable as prior art with regard to the present disclosure.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

According to one or more exemplary embodiments relate to a display apparatus capable of improving fineness of an image through texture generation with respect to a texture-lost image due to an image enlargement, an image compression, and the like, and an image processing method thereof.

According to an aspect of an exemplary embodiment, there is provided a display apparatus including an input interface; a first storage; a display; and a processor configured to control the first storage to store pixel values corresponding to a predetermined number of lines in an image which is input through the input interface, acquire a first patch of a predetermined size by sampling a plurality of pixel values located in an outer region of a matrix centering about a specific pixel value from among the pixel values stored in the first storage, acquire a high-frequency component for the specific pixel value based on the first patch, and display the input image via the display by processing the input image based on the high-frequency component.

The processor may acquire a second patch by changing positions of the plurality of pixel values based on the specific pixel value in the first patch according to a predetermined order.

The processor may perform blurring processing on the second patch, acquire a third patch including the high-frequency component for the specific pixel value based on differences between the pixel values in the first patch and pixel values in the blurring-processed second patch, and apply the acquired third patch to the specific pixel value of the input image.

The processor may acquire weight values for a plurality of pixel values adjacent to the specific pixel value based on differences between the specific pixel value in the first patch and the plurality of pixel values and acquire the high-frequency component for the specific pixel value by applying a corresponding weight value from among the acquired weight values to each of high-frequency components included in the third patch.

The processor may perform blurring processing on pixel values located in a boundary region of the second patch by mirroring the pixel values located in the boundary region of the second patch and arranging mirrored pixel values in an outer region of the second patch.

The processor may adjust an average value of high-frequency components included in the third patch to a predetermined value and may apply the average value-adjusted third patch to the specific pixel value of the input image.

The processor may acquire the first patch having a 3*3 form that the specific pixel value is surrounded with pixel values located at vertexes of a quadrangle circumscribed about a circle with a pixel interval predetermined based on the specific pixel value as a radius and pixel values located at contact points between the circle and the quadrangle and may acquire the second patch by fixing a position of the specific pixel value in the first patch and may sequentially arrange pixel values spaced apart from each other based on the specific pixel value.

The processor may acquire the second patch by acquiring neighboring pixel values, which are located in diagonal directions based on the specific pixel value in the first patch, in one direction from among clockwise and counterclockwise directions and may sequentially arrange the neighboring pixel values, and may acquire remaining pixel values in the same direction as the one direction and may sequentially arrange the remaining pixel values.

The first storage may be implemented with an N-line memory corresponding to the predetermined number of lines. The processor may acquire the first patch by sampling a plurality of second pixel values in positions spaced by (N−1)/2 pixel interval in up, down, left, and right directions based on the specific pixel value located in (N+1)/2-th line among pixel values corresponding to the N lines stored in the first storage and a plurality of first pixel values located at vertexes of a quadrangle that the plurality of second pixel values are center points of edges.

The display apparatus may further include a second storage. The processor may, when a high-frequency component for the specific pixel value is acquired, store the acquired high-frequency component in the second storage and may sequentially acquire and store high-frequency components for next pixels in the second storage and when high-frequency components for all pixel values included in the input image are stored in the second storage, acquire a corrected image by applying the stored high-frequency components to corresponding pixel values.

According to an aspect of an exemplary embodiment, there is provided an image processing method of a display apparatus, the method including storing pixel values corresponding to the predetermined number of lines in an input image; acquiring a first patch of a predetermined size by sampling a plurality of pixel values located in an outer region of a matrix centering about a specific pixel value from among the stored pixel values; acquiring a high-frequency component for the specific pixel value based on the first patch; and displaying the input image by processing the input image based on the high-frequency component.

The acquiring of the high-frequency component may include acquiring a second patch by changing positions of the plurality of pixel values based on the specific pixel value in the first patch according to a predetermined order.

The acquiring of the high-frequency component may include performing blurring processing on the second patch and acquiring a third patch including the high-frequency component for the specific pixel value based on differences between pixel values included in the first patch and pixel values included in the blurring-processed second patch.

The acquiring of the high-frequency component may include acquiring the high-frequency component for the specific pixel value by acquiring weight values for a plurality of pixel values adjacent to the specific pixel value based on differences between the specific pixel value in the first patch and the plurality of pixel values and applying a corresponding weight value among the acquired weight values to each of high-frequency components in the third patch.

The acquiring of the second patch may include performing blurring processing on pixel values located in a boundary region of the second patch by mirroring the pixel values located in the boundary region of the second patch and arranging the mirrored pixel values in an outer region of the second patch.

The method may further include adjusting an average value of high-frequency components included in the third patch to a predetermined value and applying the average value-adjusted third patch to the specific pixel value of the input image.

The acquiring of the first patch may include acquiring the first patch having a 3*3 form that the specific pixel value is surrounded with pixel values located at vertexes of a quadrangle circumscribed about a circle with a pixel interval predetermined based on the specific pixel value as a radius and pixel values located in contact points of the circle and the quadrangle. The acquiring of the second patch may include acquiring the second patch by fixing a position of the specific pixel value in the first patch and sequentially arranging pixel values spaced apart from each other based on the specific pixel value.

The acquiring of the second patch may include acquiring the second patch by acquiring neighboring pixel values located in diagonal directions based on the specific pixel value in the first patch in one direction from among clockwise and counterclockwise directions and sequentially arranging the neighboring pixel values, and acquiring remaining pixel values in the same direction as the one direction and sequentially arranging the remaining pixel values.

The display apparatus may include an N-line memory corresponding to the predetermined number of lines. The acquiring of the first patch may include acquiring the first patch by sampling a plurality of second pixel values in positions spaced by a (N−1)/2 pixel interval in up, down, left, and right directions based on the specific pixel value located in (N+1)/2-th line among pixel values corresponding to the N lines stored in the memory and a plurality of first pixel values located at vertexes of a quadrangle that the plurality of second pixel values are center points of edges.

The method may further include, when the high-frequency component for the specific pixel value is acquired, storing the acquired high-frequency component and sequentially acquiring and storing high-frequency components for next pixels and when high-frequency components for all pixel values in the input image are stored, acquiring a corrected image by applying stored high-frequency components to corresponding pixel values.

According to an aspect of an exemplary embodiment, there is provided a non-transitory computer-readable recording medium which stores computer instructions which allow a display apparatus to execute an operation when the computer instructions are executed by a processor of the display apparatus, the operation including storing pixel values corresponding to the predetermined number of lines in an input image; acquiring a first patch of a predetermined size by sampling a plurality of pixel values located in an outer region of a matrix centering about a specific pixel value among the stored pixel values; acquiring a high-frequency component for the specific pixel value based on the first patch; and processing the input image based on the high-frequency component.

According to the above-described various exemplary embodiments, the fineness of the image may be improved through texture generation with respect to the image of which the texture is lost due to image enlargement and/or image compression.

Additional aspects and advantages of exemplary embodiments are set forth in the detailed description, and will be obvious from the detailed description, or may be learned by practicing exemplary embodiments.

BRIEF DESCRIPTION OF THE DRAWING FIGURES

The above and/or other aspects, features, and advantages of certain embodiments of the present disclosure will be more apparent from the following description taken in conjunction with the accompanying drawings, in which:

FIGS. 9A and 9B are diagrams illustrating a method of applying a high-frequency component to an input image according to an embodiment;

DETAILED DESCRIPTION OF THE EXEMPLARY EMBODIMENTS

Figure 1:
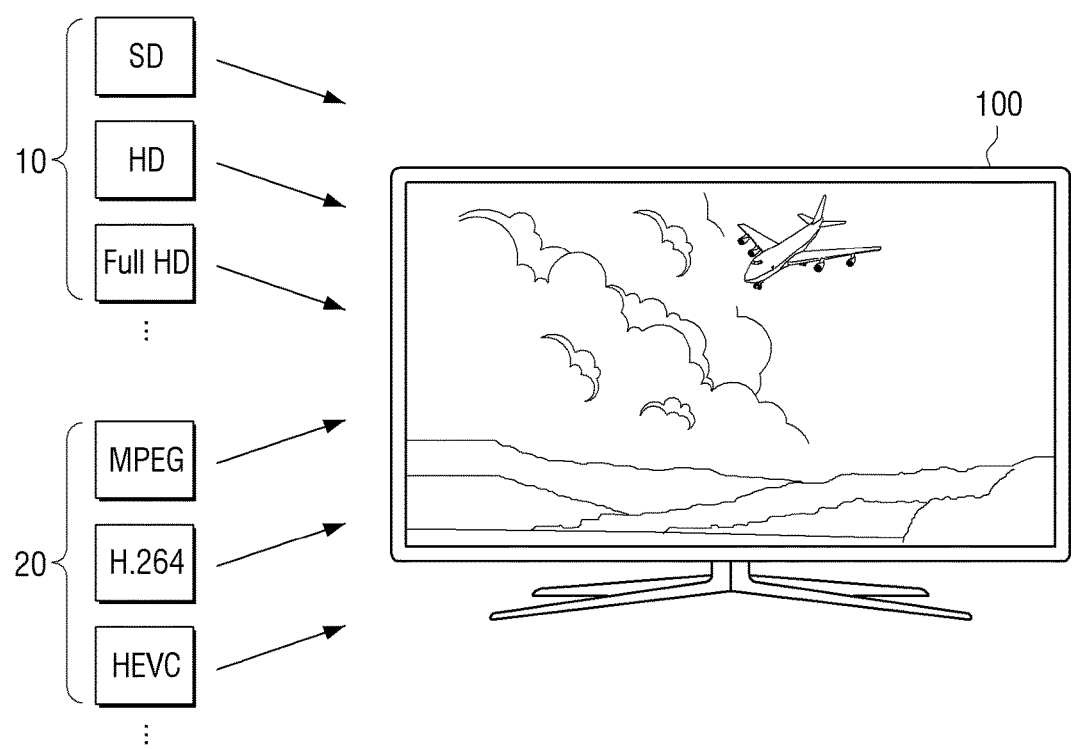
FIG. 1 is a view illustrating an implementation example of a display apparatus according to an embodiment.

Hereinafter, exemplary embodiments of the disclosure will be described more fully with reference to the accompanying drawings, in which the exemplary embodiments of the disclosure are shown to understand a configuration and an effect of the disclosure. The disclosure may, however, be embodied and modified in many different forms and should not be construed as limited to the exemplary embodiments set forth herein. To more clearly describe features of the exemplary embodiments, detailed description for contents widely known to those skilled in the art will be omitted for clarity.

Unless otherwise described, any portion including any element may refer to the portion further including other elements not excluding the other elements. Various elements and regions in the drawings may be schematically drawn. Accordingly, the technical concept of the present disclosure is not limited by a relative size or spacing drawn in the accompanying drawings.

Hereinafter, an exemplary embodiment of the present disclosure will be described in detail with reference to the accompanying drawings.

FIG. 1 is a diagram illustrating an implementation example of a display apparatus according to an exemplary embodiment.

A display apparatus 100 may be implemented with a TV as illustrated in FIG. 1, but this is not limited thereto. Any apparatus having a display function such as a smart phone, a tablet personal computer (PC), a lap top computer, a head-mounted display (HMD), a near eye display (NED), a large format display (LFD), a digital signage, a digital information display (DID), a video wall, a projector display, and the like may be applied as the display apparatus 100.

The display apparatus 100 may receive various types of resolution images or various types of compressed images. For example, the display apparatus 100 may receive any one of a standard definition (SD) image, a high-definition (HD) image, a full HD image, and an ultra HD (UHD) image. The display apparatus 100 may receive an image in a compressed form of MPEG (for example, MP2, MP4, MP7, and the like), advance video coding (AVC), H.264, high efficiency video coding (HEVC) and the like, compressed forms 20.

Even when the display apparatus 100 is implemented with a UHD TV according to an exemplary embodiment, UHD content itself may be insufficient and thus a SD image, a HD image, a full HD image, and the like (hereinafter, referred to as low-resolution image 10) may be often input. A method of providing an image by enlarging the input low-resolution image to a UHD image (hereinafter, referred to as high-resolution image) may be used. However, the texture of the image is blurred in the image enlargement process and thus fineness may be degraded. The texture of the image may refer to a unique pattern or shape of a region regarded as the same texture in the image.

Even when the high-resolution image is input according to another exemplary embodiment, the texture loss due to image compression may be caused and the fineness may be degraded. The digital image may require a large amount of data according to increase in the number of pixel and the texture loss due to data compression may be inevitably caused in compression of the large amount of data.

Hereinafter, methods, which improve fineness of an image by restoring a texture component lost due to various reasons described above, according to various exemplary embodiments, will be described.

Figure 2:
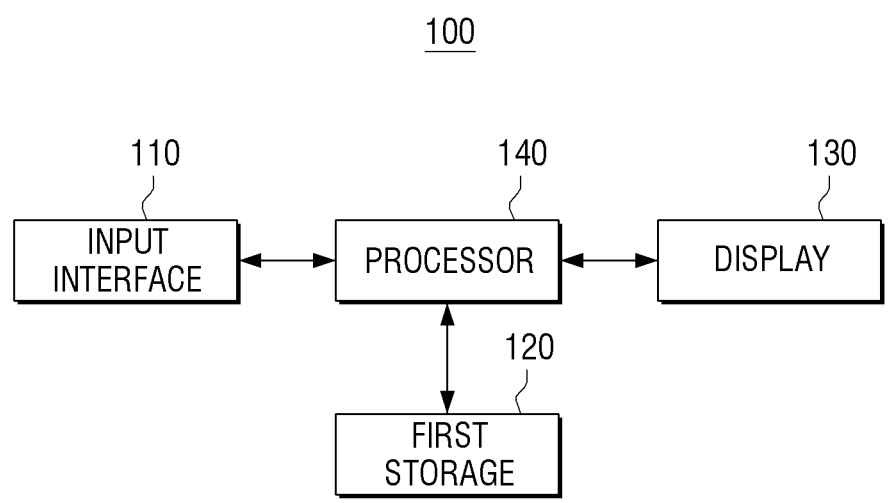
FIG. 2 is a block diagram illustrating a configuration of a display apparatus according to an embodiment.

FIG. 2 is a block diagram illustrating a configuration of a display apparatus according to an exemplary embodiment.

Referring to FIG. 2, the display apparatus 100 may include an input interface 110, a first storage 120, a display 130, and a processor 140.

The input interface 110 may receive various types of content. For example, the input interface 110 may receive an image signal in a streaming or downloading manner from an external apparatus (for example, a source apparatus), an external storage medium (for example, universal serial bus (USB)), an external server (for example, a web hard), and the like through a communication method such as access point (AP)-based WiFi (wireless local area network (LAN)), Bluetooth, Zigbee, wired/wireless LAN, wide area network (WAN), Ethernet, IEEE1394, high-definition multimedia interface (HDMI), USB, mobile high-definition link (MHL), audio engineering society/European broadcasting union (AES/EBU), optical, coaxial, and the like. Here, the image signal may be a digital signal, but this is not limited thereto. The input interface 110 is hardware or a combination of hardware and software according to an exemplary embodiment.

The first storage 120 may store at least a portion of an image input through the input interface 110. For example, the first storage 120 may store at least a partial region of an input image frame. In this example, the at least a partial region may be a region required to perform image processing according to an exemplary embodiment. The first storage 120 according to an exemplary embodiment may be implemented with an N-line memory. For example, the N-line memory may be a memory having a capacity equivalent to 17 lines in a vertical direction, but this is not limited thereto. In this example, when a full HD image of 1080p (1,920×1,080 resolution) is input, only 17-line image regions of the full HD image may be stored in the first storage 120. Accordingly, the first storage 120 may be implemented with the N-line memory and only the partial region of the input image frame may be stored to perform image processing. This is because the memory capacity of the first storage 120 is limited according to hardware limitations.

Accordingly, in an exemplary embodiment, the first storage 120 may perform the image processing by storing only an image region of the input image frame corresponding to the predetermined number of lines and continuously perform image processing while storing the image region delayed by an at least one line. Such an operation will be described in detail later.

The display 130 may be implemented with various types of displays, for example, a liquid crystal display (LCD) panel, an organic light-emitting diode (OLED) panel, a liquid crystal on silicon (LCoS) panel, a digital light processing (DLP) panel, a quantum dot (QD) display panel, and the like.

The processor 140 may control an overall operation of the display apparatus 100.

The processor 140 according to an exemplary embodiment may be implemented with a digital signal processor (DSP), a microprocessor, and a time controller (TCON) which process a digital image signal, but this is not limited thereto. The processor 140 may include one or more among a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 140 may be implemented in a system on chip (SoC) type or a large scale integration (LSI) type which a processing algorithm is built therein or in a field programmable gate array (FPGA) type.

The processor 140 according to an exemplary embodiment may store pixel values corresponding to the predetermined number of lines in an image input through the input interface 110 in the first storage 120. The predetermined number of lines may refer to the maximum line capacity of the first storage 120. For example, when the first storage 120 is implemented with a 17-vertical line memory, the processor 140 may store pixel values corresponding to the 17 lines in the input image frame.

The processor 140 may acquire a first patch of a predetermined size by sampling a plurality of pixel values in positions spaced apart to different directions from each other based on a specific pixel value among the pixel values stored in the first storage 120. The predetermined size may have various sizes, for example 3*3, 5*5, and the like. Hereinafter, the operation of acquiring the first patch will be described under the assumption that the first patch has a 3*3 size.

For example, when the pixel values corresponding to N lines of the input image are stored in the first storage 120 which is implemented with the N-line memory, the processor 140 may acquire the first patch by sampling a plurality of pixel values located in an outer region of an N*N matrix centering about a specific pixel value located in a (N+1)/2-th line. In some exemplary embodiments, the processor 140 may acquire the first patch by sampling the plurality of pixel values located in the outer region of the matrix having an area smaller than N based on the specific pixel value located in the (N+1)/2-th line.

In an exemplary embodiment, the processor 140 may acquire the first patch by sampling a plurality of first pixel values in positions spaced by a (N−1)/2 pixel interval to the up, down, left, and right directions based on the specific pixel value located in the (N+1)/2-th line and a plurality of second pixel values located in vertexes of a quadrangle that the plurality of first pixel values are center points of edges.

For example, the processor 140 may acquire the first patch of a N*N form that the specific pixel value is surrounded with the first pixel values located in the vertexes of the quadrangle circumscribed about a circle with a pixel interval (for example, (N−1)/2) pixel interval) predetermined based on the specific pixel value as a radius and the second pixel values located in contact points between the corresponding circle and the corresponding quadrangle.

Figure 3:
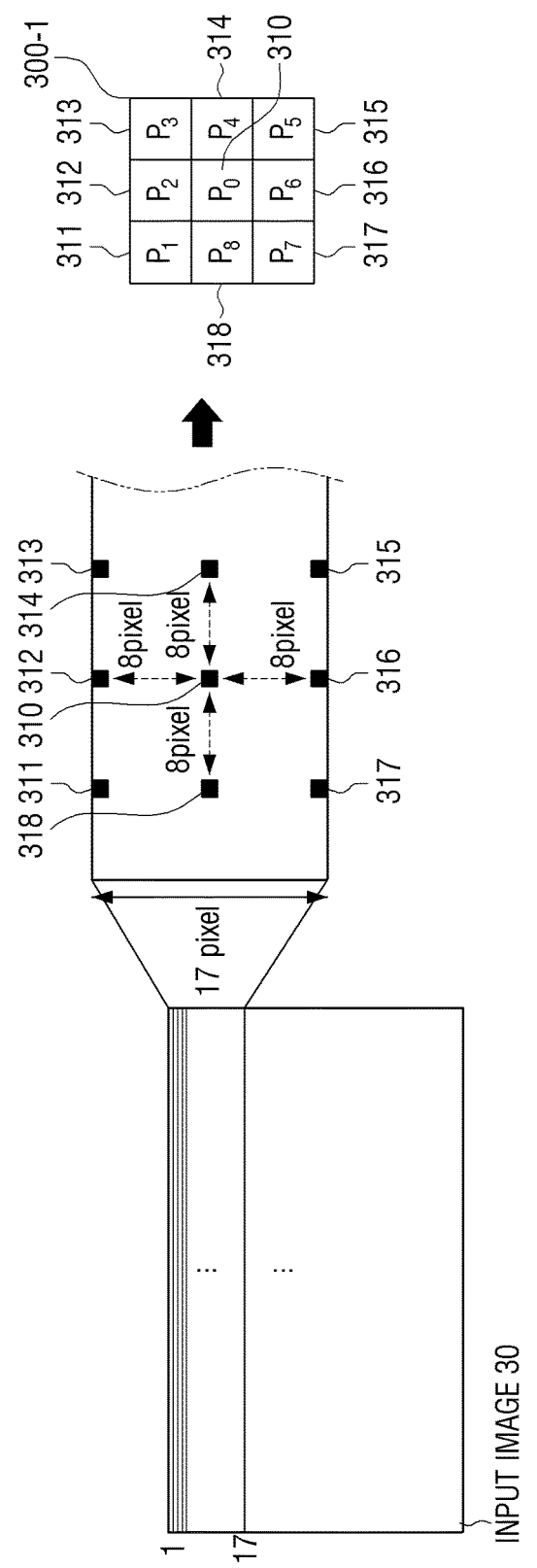
FIG. 3 is a diagram illustrating a method of acquiring a first patch according to an embodiment.

FIG. 3 is a diagram illustrating a method of acquiring a first patch according to an exemplary embodiment.

FIG. 3 illustrates that the first storage 120 according to an exemplary embodiment is implemented with the 17-line memory. As described above, only the pixel values of the maximum 17 lines in an input image 30 may be stored in the first storage 120. To generate a maximum high-frequency in the 17-line memory provided in a hardware in an exemplary embodiment, the first patch may be generated by sampling pixels maximally spaced from a current pixel (or the center pixel) to meet the predetermined sampling criterion.

The sampling criterion may be equally applied to one content, for example, each frame of a moving image. This is performed to consistently generate texture between neighboring frames in the moving image. However, in some exemplary embodiment, the sampling criterion may be changed in predetermined interval units (for example, in scene units). For example, when the sampling criterion matching with an image characteristic of each scene is present, different sampling criterions may be applied to the scenes. The current pixel (or center pixel) may refer to a pixel applied to the high-frequency component acquired according to an exemplary embodiment.

The predetermined sampling criterion according to an exemplary embodiment may be set to sample a plurality of pixels included in a square shape circumscribed about a circle having a maximum radius based on the current pixel. For example, the pixel values, which are located in the corresponding square shape in eight directions including up and down directions, left and right directions, and diagonal directions based on the current pixel, may be sampled.

As illustrated in FIG. 3, the processor 140 may sample first pixel values 311, 313, 315, and 317 located in vertexes of a quadrangle circumscribed about a circle with eight pixels as a radius based on a current pixel 310 and second pixel values 312, 314, 316, and 318 located in contact points of the corresponding circle and the corresponding quadrangle as pixel values for the first patch.

The frequency in the image may refer to a change rate of a pixel value and the fineness of the image may be represented with the high-frequency component. In general, a difference between the current pixel and a pixel value spaced far away from the current pixel may be likely to be large and thus the high-frequency component for the current pixel may be acquired using the pixel values spaced based on the current pixel. Accordingly, the high-frequency component may be acquired using the pixel values maximally spaced based on the current pixel under the limitations of a hardware memory capacity in an exemplary embodiment.

The processor 140 may acquire a first patch 300-1 having a 3*3 matrix form that the current pixel value 310 is located in the center and the plurality of sampled pixel values 311 to 318 are adjacent to the current pixel in the up and down, left and right, and diagonal directions.

However, this is merely exemplary and the sampling criterion is not limited thereto. For example, other than the first pixel values 311, 313, 315, and 317 located in the vertexes of the quadrangle illustrated in FIG. 3, pixel values (not shown) adjacent to the current pixel value in the inner side of the diagonal directions of the first pixels 311, 313, 315, and 317 may be sampled as the pixel values for the first patch.

According to an exemplary embodiment, the processor 140 may acquire a second patch by changing the positions of the plurality of pixel values on the basis of the specific pixel value according to a predetermined order and acquire the high-frequency component for the specific pixel value based on the acquired second patch. When the first patch is acquired, the processor 140 may acquire the second patch by changing the positions of the plurality of pixel values included in the first patch according to a predetermined reordering criterion. The recording of the pixel values may be performed to acquire the high-frequency component having randomness within the limited memory capacity.

When the texture is generated through the reordering process of the pixel values, the fine texture component having no horizontal/vertical lattice noise may be generated.

For example, the processor 140 may acquire the second patch by fixing the current pixel value in the first patch to the center and sequentially arranging the pixel values spaced apart from each other on the basis of the current pixel value. The reordering criterion may be equally applied to one content, for example, each frame of a moving image. This is to consistently generate the texture between neighboring frames in one moving image. In some exemplary embodiments, the reordering criterion may be changed to the predetermined interval units (for example, scene units). For example, when the reordering criterion matching with the image characteristic of each scene is present, the reordering criterion may be differently applied to each scene.

Figure 4A:
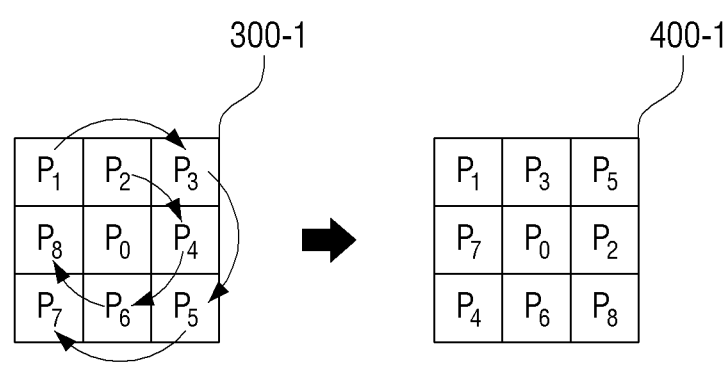
FIGS. 4A and 4B are diagrams illustrating a method of acquiring a second patch by reordering a pixel position of a first patch according to an embodiment.

FIG. 4A is a diagram illustrating a method of acquiring second patch by reordering pixel positions of the first patch according to an exemplary embodiment.

Referring to FIG. 4A, the processor 140 may acquire a second patch 400-1 by applying the reordering criterion that acquires neighboring pixel values located in the diagonal directions based on the current pixel value in the first patch 300-1 in one direction from among clockwise and counterclockwise directions and may sequentially arrange the neighboring pixel values, and may acquire remaining pixel values in the same direction as the one direction and may sequentially arrange the remaining pixel values. For example, when arranging the acquired pixel values, the processor 140 may arrange the pixel values from left to right in the first line of matrix form. Since there is no space in the first line, the processor 140 may arrange the pixel values on the next line from left to right, according to an exemplary embodiment.

For example, as illustrated in FIG. 4A, the processor 140 may acquire the second patch 400-1 by applying the reordering criterion that acquires the pixel values 311, 313, 315, and 317 located in the diagonal directions based on the current pixel value 310 in the first patch 300-1 in a clockwise direction and may sequentially arrange the pixel values 311, 313, 315, and 317, and may acquire the remaining pixel values 312, 314, 316, and 318 in the same direction (clockwise direction) and may sequentially arrange the remaining pixel values 312, 314, 316, and 318, as shown in FIG. 4A.

However, this is merely exemplary and the reordering criterion is not limited thereto.

For example, the processor 140 may acquire the second patch by applying the reordering criterion that acquires pixel values located in the diagonal directions based on the current pixel value in the first patch in one direction from among the clockwise and counterclockwise directions and may sequentially arrange the pixel values, and may acquire remaining pixel values in the opposite direction to the one direction and may sequentially arrange the remaining pixel values.

Figure 4B:
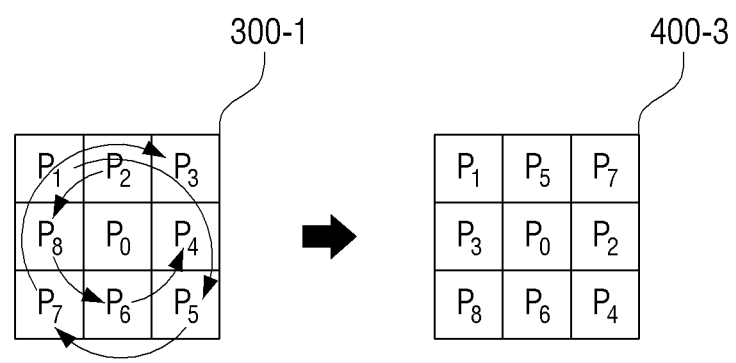

In another example, as illustrated in FIG. 4B, the processor 140 may acquire a second patch 400-3 by applying the reordering criterion that acquires the pixel values 311, 315, 317, and 313 located in the diagonal directions based on the current pixel value 310 in a clockwise direction and may sequentially arrange the pixel values 311, 315, 317, and 313, and may acquire the remaining pixel values 312, 314, 316, and 318 in the counterclockwise direction and may sequentially arrange the pixel values 312, 314, 316, and 318. Accordingly, the reordering criterion may be variously applied under the condition that the pixels values in the spaced positions are arranged adjacent to each other.

In an exemplary embodiment, when the second patch is acquired, the processor 140 may perform blurring (or smoothing) processing on the acquired second patch and acquire a third patch including the high-frequency component for the current pixel value based on differences between the pixel values included in the first patch and the pixel values included in the blurring-processed second patch. In another exemplary embodiment, the processor 140 may acquire the third patch including the high-frequency component based on the first patch. The processor 140 may acquire the third patch including the high-frequency component for the current pixel value based on differences between the pixel values included in the first patch and the pixel values included in the blurring-processed first patch. For clarity, hereinafter, the method of acquiring the third patch will be described under the assumption that the high-frequency component is acquired based on the second patch acquired through the pixel value reordering.

To perform the blurring processing on the second patch of a 3*3 form, the processor 140 may apply a low pass filter which filters the high-frequency component. For example, the processor 140 may perform Gaussian blurring (or Gaussian filtering) processing. The Gaussian blurring may be a blurring processing method using a Gaussian filter based on a Gaussian probability distribution and when the Gaussian filter is applied to the second patch, the high-frequency component may be cut off and then blurring-processed.

Figure 5A:
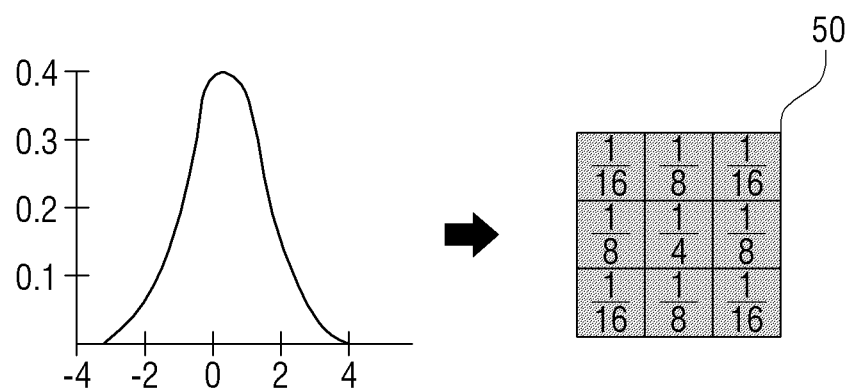
FIGS. 5A to 5C are diagram illustrating a blurring method for a second patch according to an embodiment.
Figure 5B:
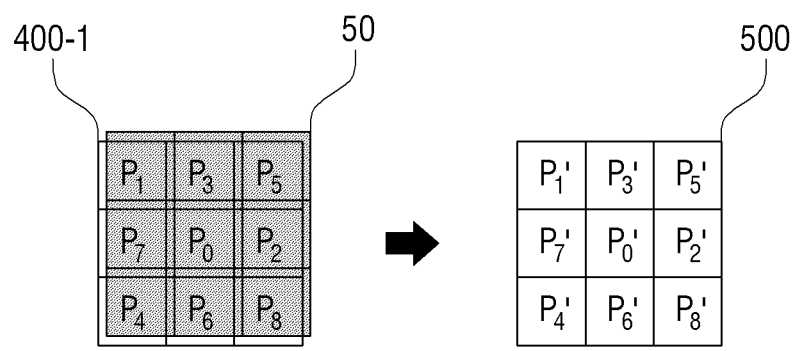
Figure 5C:
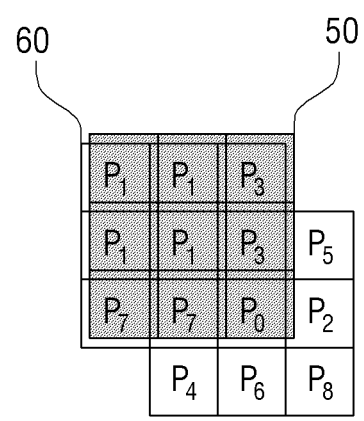

FIGS. 5A to 5C are diagram illustrating a blurring method with respect to a second patch according to an exemplary embodiment.

For example, the Gaussian filter may have a form that the weight value may be large in '0 (zero)' on an X-axis and may be reduced as the absolute value of the numeric value on the X-axis is increased as illustrated in FIG. 5A. When the Gaussian filter is applied to a 3*3 mask 50, the weight value may be large in the center of the mask 50 and the weight value may be reduced toward an edge of the mask 50. The numerical value illustrated in FIG. 5A is merely exemplary and the filtering numerical value may be changed according to a sigma value of the Gaussian function.

The processor 140 may perform Gaussian blurring processing on the second patch 400-1 by applying the Gaussian mask 50 to the pixel values included in the second patch 400-1 as illustrated in FIG. 5B. For example, the processor 140 may perform filtering on each pixel value while moving the Gaussian mask 50 in such a manner that each pixel value included in the second patch 400-1 is located in the center of the Gaussian mask 50.

In this example, the processor 140 may perform filtering on the pixel values located in a boundary of the second patch 400-1 based on pixel values mirrored with respect to the pixel values located in the boundary of the second patch 400-1. When the processor performs filtering by locating the pixel value (for example, P1) in a (1,1) position of the second patch 400-1 in the center of the Gaussian mask 50, the processor may generate a virtual second patch 60 centering about the P1 value by mirroring the pixel values in the boundary positions and then perform filtering by locating the P1 value to the center of the Gaussian mask 50 as illustrated in FIG. 5C.

Accordingly, the processor 140 may acquire a blurred second patch 500 (FIG. 5B) by performing Gaussian filtering on all the pixels included in the second patch 400-1.

Figure 6:
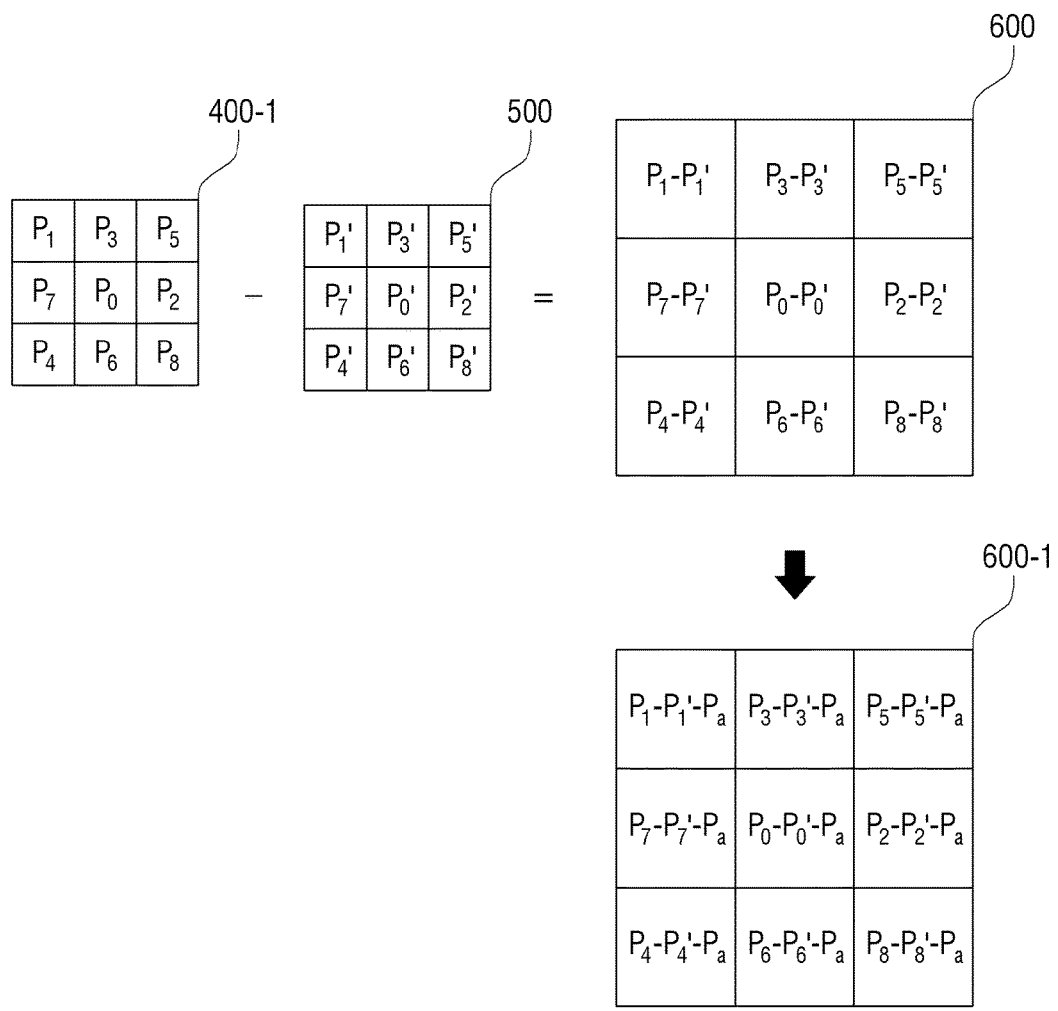
FIG. 6 is a diagram illustrating a method of acquiring a third patch according to an embodiment.

FIG. 6 is a diagram illustrating a method of acquiring a third patch according to an exemplary embodiment.

Referring to FIG. 6, the processor may acquire a third patch 600 by subtracting each of pixel values of corresponding locations included in the blurred second patch 500 acquired in FIG. 5B from each of pixel values included in the 3*3 second patch 400-1 according to an exemplary embodiment. The values included in the acquired third patch 600 may be high-frequency components related to the center pixel value P0.

For example, high-frequency components in positions (1-1), (1-2), (1-3), (2-1), (2-2), (2-3), (3-1), (3-2), and (3-3) in the third patch 600 may be (P1-P1'), (P3-P3'), (P5-P5'), (P7-P7'), (P0-P0'), (P2-P2'), (P4-P4'), (P6-P6'), and (P8-P8') and may be the high-frequency components related to the center pixel value P0. This is because the high-frequency component is included in the second patch 400-1 and is not included in the blurred second patch 500, as described above.

When the third patch 600 including the high-frequency component is acquired, the processor 140 may adjust an average value of the high-frequency components included in the third patch 600 to 0 (zero). This is to acquire positive (+) and negative (−) high-frequency components based on the center pixel value P0.

For example, the processor 140 may adjust the average value of the high-frequency components included in the third patch 600 to '0 (zero)' by calculating an average value Pa of the high-frequency components included in the third patch 600 and subtracting the average value Pa from each high-frequency component as illustrated in FIG. 6. In this example, the high-frequency components included in the third patch (hereinafter, referred to as 'corrected third patch') 600-1 that the average value is adjusted to '0 (zero)' may be (P1-P1'-Pa), (P3-P3'-Pa), (P5-P5'-Pa), (P7-P7'-Pa), (P0-P0'-Pa), (P2-P2'-Pa), (P4-P4'-Pa), (P6-P6'-Pa), and (P8-P8'-Pa).

According to another exemplary embodiment, the processor 140 may acquire weight values for a plurality of pixels based on a difference between the current pixel value in the first patch and each of the plurality of pixel values adjacent to the current pixel value. The processor 140 may acquire the final high-frequency component for a specific pixel value by applying the corresponding weight values to the high-frequency components included in the corrected third patch 600-1. This is to prevent a side effect such as ringing by reducing the weight value for the corresponding pixel value when the difference between the current pixel value P0 located in the center in the second patch 400-1 and each of the plurality of neighboring pixel values is larger than a predetermined threshold value.

For example, the processor 140 may acquire the weight value based on the following equation 1.

$$W(x,y)=\exp(-|P(x,y)-Pc|) \quad \text{Equation 1}$$

Here, Pc indicates a center pixel value and P(x,y) indicates a neighboring pixel value.

The weight value may be calculated in a weight map form and may be applied to the third patch. For example, the processor 140 may acquire the weight-applied third patch by multiplying the 3*3 weight map to the 3*3 third patch.

Figure 7A:
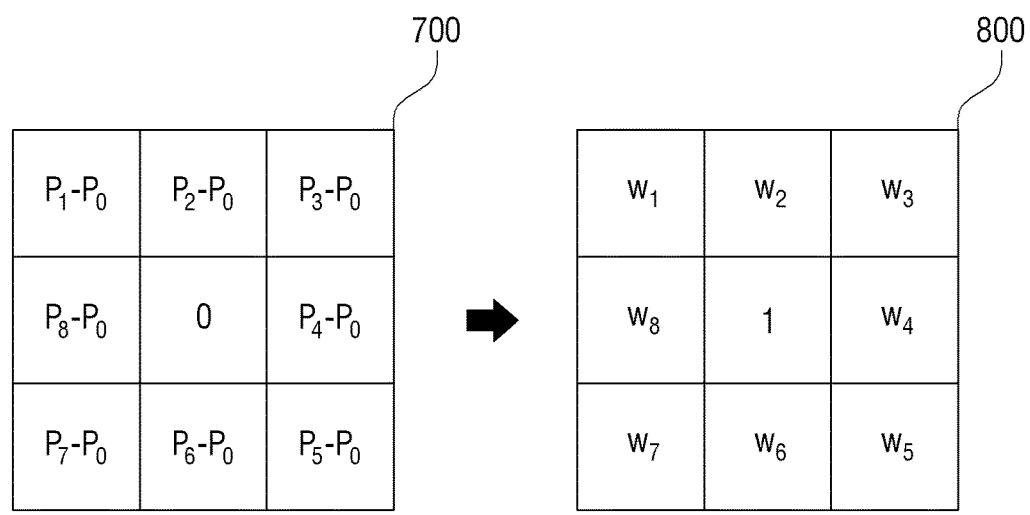
FIGS. 7A and 7B are diagrams illustrating a method of acquiring a weight-applied third patch according to an embodiment.
Figure 7B:
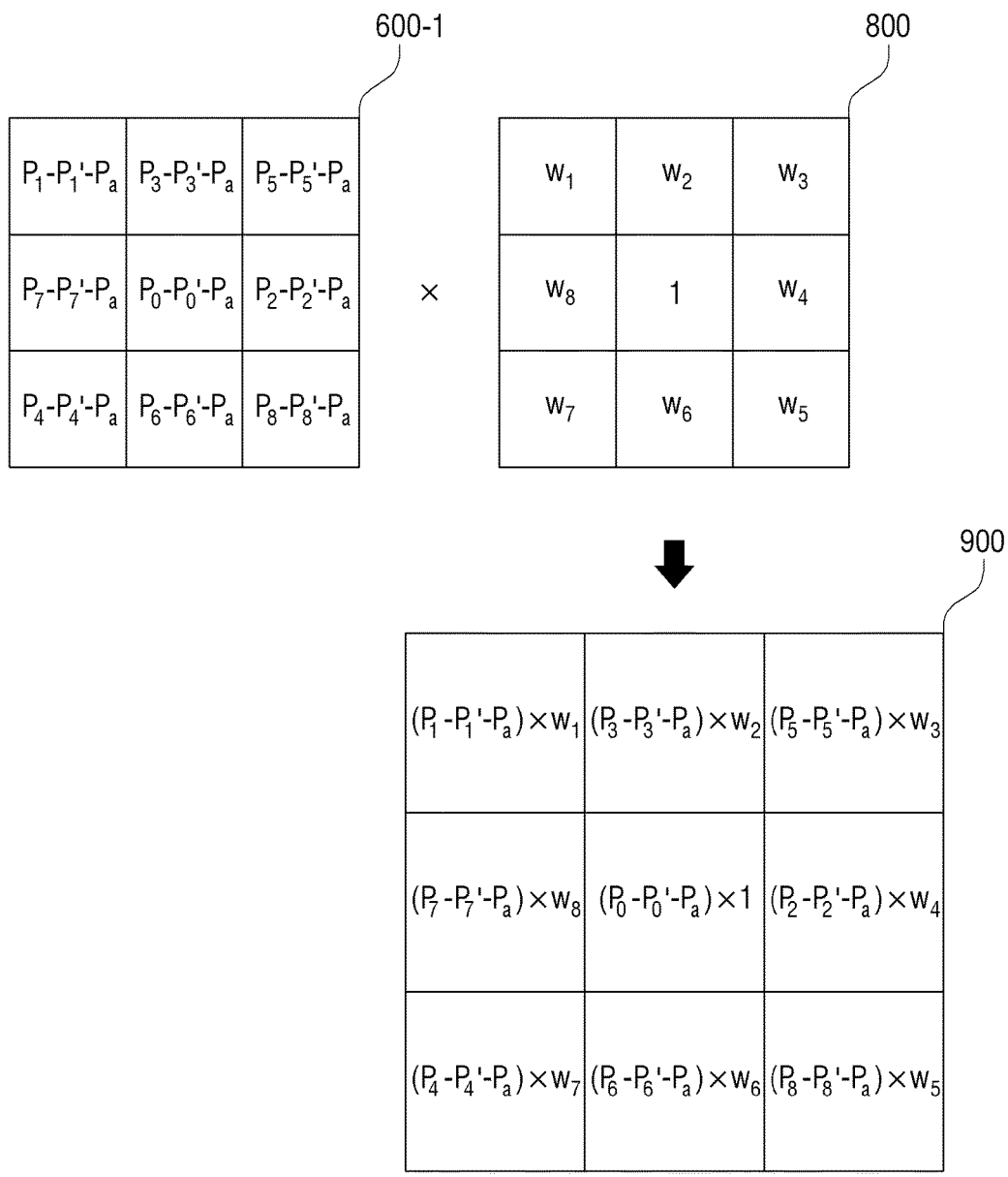

FIGS. 7A and 7B are diagrams illustrating a method of acquiring a weight-applied third patch according to an exemplary embodiment.

FIG. 7A is a diagram illustrating a method of acquiring a 3*3 weight map according to an exemplary embodiment.

Referring to FIG. 7A, the processor may acquire a 3*3 weight map 800 according to an exemplary embodiment corresponding to the first patch 300-1 based on a difference 700 between the current pixel value (for example, the center pixel value P0) included in the 3*3 first patch 300-1 and each of the remaining pixels P1 to P8.

The weight values in positions (1,1), (1,2), (1,3), (2,1), (2,2), (2,3), (3,1), (3,2), and (3,3) in the 3*3 weight map 800 may be acquired based on the values (P1-P0), (P2-P0), (P3-P0), (P4-P0), (P0-P0), (P5-P0), (P6-P0), (P7-P0), and (P8-P0).

For example, the processor 140 may set the weight value in the position (2, 2) (for example, the position corresponding to the center pixel value) to '1' and acquire the weight values w1 to w8 of the pixel values in the remaining positions based on the difference 700 between the center pixel value P0 and each of the remaining pixel values P1 to P8.

FIG. 7B is a diagram illustrating a method of applying a weight map to a second patch according to an exemplary embodiment.

As illustrated in FIG. 7B, the processor may acquire a weight-applied third patch 900 according to an exemplary embodiment by 1:1 multiply the high-frequency components of the corrected third patch 600-1 and the weight values of the corresponding positions in the weight map 800 calculated in FIG. 7A.

The processor 140 may process an input image based on the acquired high-frequency components, for example, the corrected third patch 600-1. When the weight map is applied according to another exemplary embodiment, the processor may process the input image based on the weight-applied third patch 900. Hereinafter, for clarity, it will be described that the input image is processed based on the weight-applied third patch 900.

In an exemplary embodiment, when the third patch 900 for the current pixel value, for example, the high-frequency components, is acquired, the processor 140 may store the acquired high-frequency components in a second storage (not shown). The second storage may be implemented with a separate memory from the first storage 120.

When the high-frequency component for the specific pixel value is acquired, the processor 140 may store the acquired high-frequency component, for example, the third patch in the second storage and the processor 140 may sequentially acquire the high-frequency components for next pixel values and store the acquired high-frequency components in the second storage. When the high-frequency components for all the pixels included in the input image are stored in the second storage, the processor 140 may acquire a corrected image by applying the stored high-frequency components to corresponding pixel values.

Figure 8:
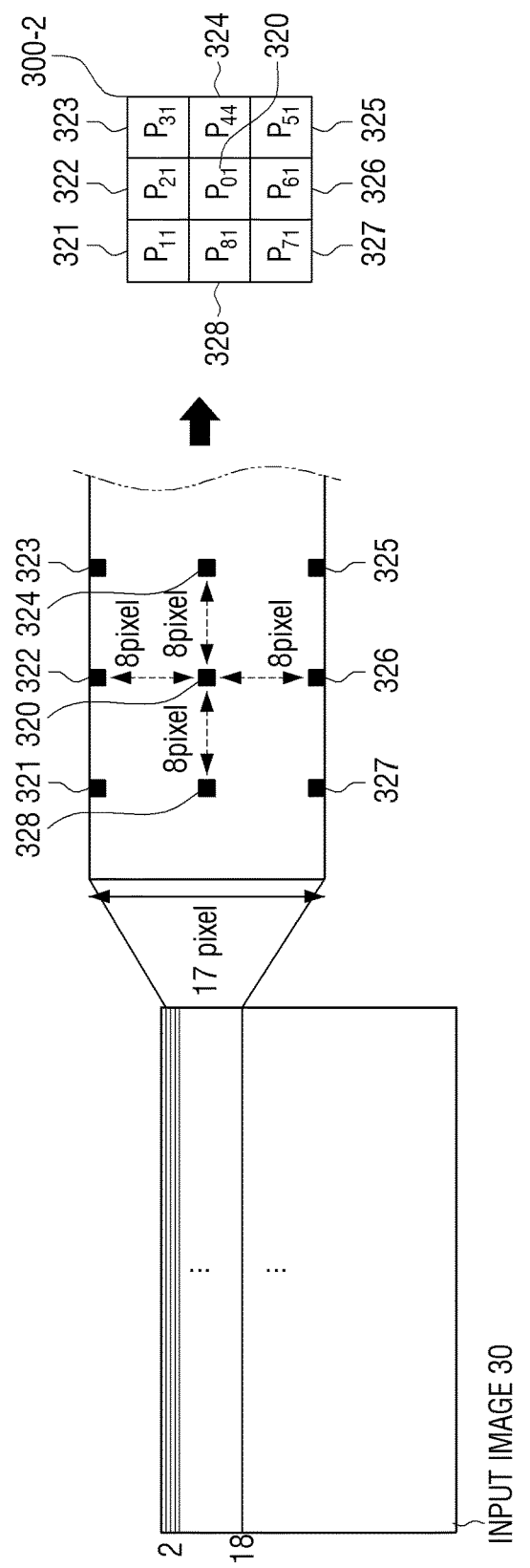
FIG. 8 is a diagram illustrating a method of acquiring a high-frequency component for next pixel value according to an embodiment.

FIG. 8 is a diagram illustrating a method of acquiring a high-frequency component for next pixel value according to an exemplary embodiment.

When the high-frequency component for the specific pixel value 310 is acquired based on pixel values of first to 17-th lines in the input image 30, the processor 140 may store pixel values of second to 18-th lines in the first storage 120 and acquire a high-frequency component corresponding to next pixel value 320 based on the storage pixel values. The methods illustrated in FIGS. 4A to 7B may be equally applied to the method of acquiring the high-frequency component for the next pixel value 320 and thus the detailed description therefor will be omitted. The processor 140 may acquire the high-frequency components for all the pixel values included in the input image 30 through the same method as the above-described method by writing pixel values delayed by one line in the input image 30 in the first storage 120. In some exemplary embodiments, the processor may acquire high-frequency components for pixel values corresponding to n multiple lines of the input image 30 by delaying the pixel values in n (n>1) line units. In this example, the fineness of the image may be slightly degraded, but the calculation amount may be reduced.

Figure 9B:
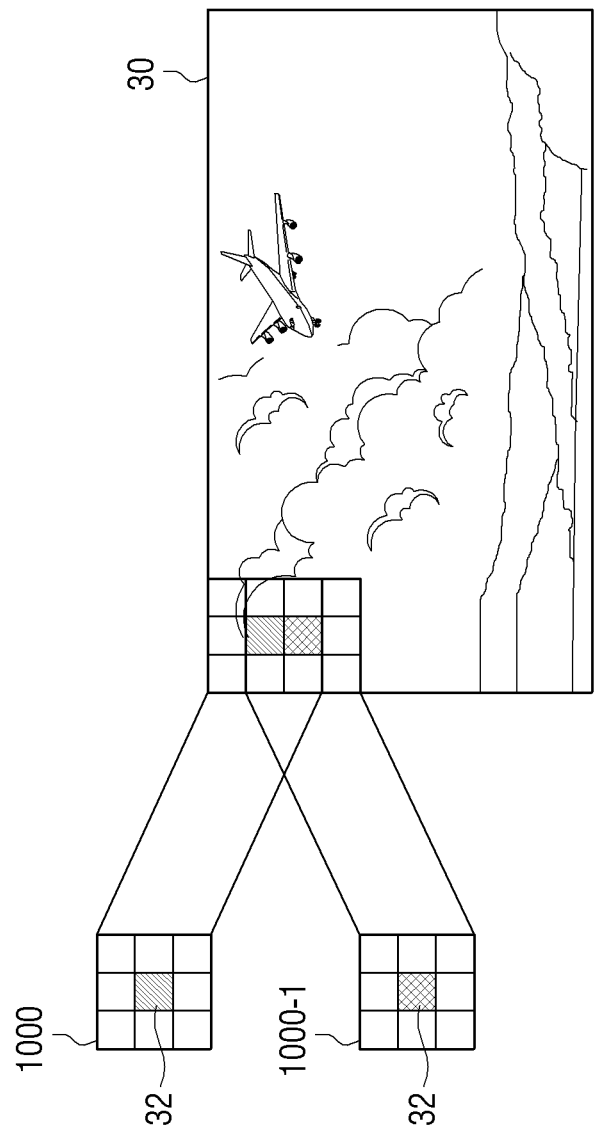

FIGS. 9A and 9B are diagrams illustrating a method of applying high-frequency components to an input image according to an exemplary embodiment.

FIG. 9A is a diagram illustrating a method of acquiring a high-frequency component image corresponding to an input image and applying the acquired high-frequency component image to the input image according to an exemplary embodiment.

As illustrated in FIG. 9A, when a third patch 1000 including a high-frequency component for a first pixel 31 is acquired, the processor 140 may store the acquired third patch 1000 in the second storage (not shown) and when a third patch 1000-1 including a high-frequency component for a second pixel 32 is acquired, the processor 140 may store the third patch 1000-1 in such a manner that the center of the third patch 1000-1 corresponds to a position of the second pixel 32. When a third patch 1000-2 including a high-frequency component for a third pixel 33 is acquired, the processor 140 may store the third patch 1000-2 in such a manner that the center of the third patch 1000-2 corresponds to a position of the third pixel 33. When the high-frequency components for all the pixels, for example, the third patch is acquired and stored, the high-frequency components may be stored to overlap each other and thus a high-frequency image 800' corresponding to a size of the input image may be acquired. The processor 140 may acquire a corrected image by applying the acquired high-frequency component image 800' to the input image 30.

FIG. 9B is a diagram illustrating a method of applying a third patch including an acquired high-frequency component to a corresponding pixel of an input image in real time according to another exemplary embodiment.

According to another exemplary embodiment, when the third patch 1000 including the high-component component for the first pixel 31 is acquired, the processor 140 may apply the third patch 1000 to the input image 30 in such a manner that the center of the acquired third patch 1000 corresponds to the first pixel 31 and when the third patch 1000-1 including the high-frequency component for the second pixel 32 is acquired, the processor 140 may apply the third patch 1000-1 to the input image 30 in such a manner that the center of the acquired third patch 1000-1 corresponds to the second pixel 32. Accordingly, the processor 140 may acquire the corrected image by sequentially apply the high-frequency components for all the pixels included in the input image 30 to the input image.

The above-described image processing process may be performed before or after image scaling according to an exemplary embodiment. For example, the above-described image processing may be performed after scaling for enlarging the low-resolution image to the high-resolution image or the above-described image processing may be performed in the process of decoding a compressed image before the scaling.

Figure 10:
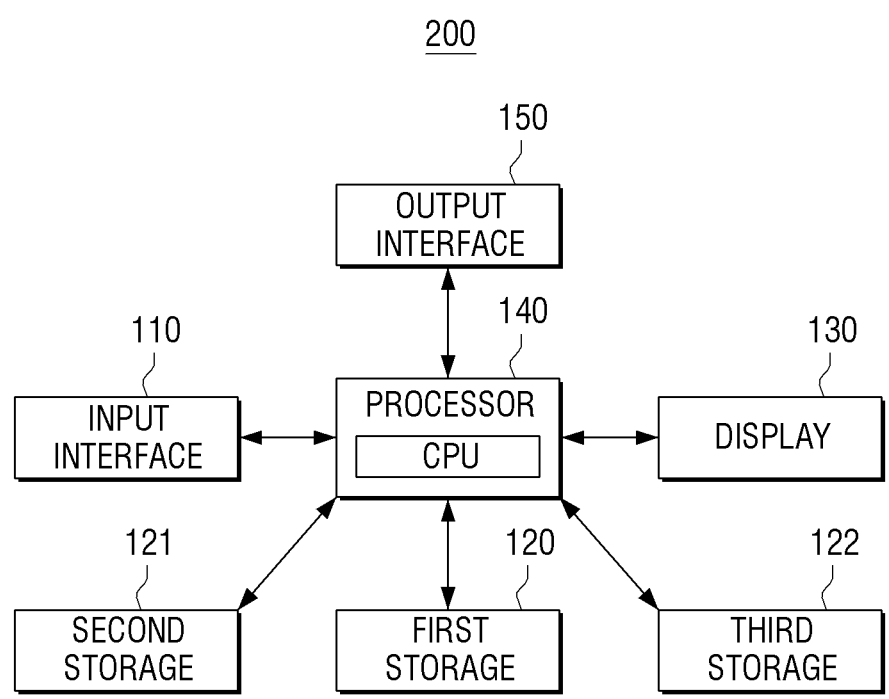
FIG. 10 is a block diagram illustrating a configuration of a display apparatus according to another embodiment.

FIG. 10 is a block diagram illustrating a configuration of a display apparatus according to another exemplary embodiment. Referring to FIG. 10, a display apparatus 200 may include an input interface 110, a first storage 120, a second storage 121, a third storage 122, a display 130, a processor 140, and an output interface 150. Detailed description for a configuration of FIG. 10 overlapping the configuration illustrated in FIG. 2 will be omitted.

The processor 140 may include a CPU, a read only memory (ROM) (or nonvolatile memory) (not shown) in which a control program for control of the display apparatus 200 is stored, and a random access memory (RAM) (or volatile memory) (not shown) used a storage region which stores data input from the outside of the display apparatus 200 or corresponds to various jobs performed in the display apparatus 200.

The processor 140 may perform various operations using the various types of stored program, content, data, and the like by accessing at least one among the first to third storage 120, 121, and 122.

The at least one among the first to third storage 120 to 122 may be implemented with an internal memory, for example, the ROM, the RAM, and the like included in the processor 140 or may be implemented with a separate memory from the processor 140. The at least one of the first to third storages 120 to 122 may be implemented in a memory form embedded in the display apparatus or in a memory form detachable to the display apparatus 200 according to the data storage use. For example, the data for driving the display apparatus 200 may be stored in the memory embedded in the display apparatus 200 and the data for an expansion function of the display apparatus 200 may be stored in the memory detachable to the display apparatus 200. The memory embedded in the display apparatus 200 may be implemented in a form of a nonvolatile memory device, a volatile memory device, a hard disc drive (HDD), or a solid state drive (SSD), and the like and the memory detachable to the display apparatus 200 may be implemented in a form of a memory card (for example, micro secure digital (SD) card, universal serial bus (USB) memory, and the like), an external memory (for example, USB memory) connectable to a USB port, and the like.

The first storage 120 may be implemented with an N-line memory as described above. For example, the first storage 120 may be implemented with an internal memory. In this example, the first storage 120 may be implemented with the N-line memory according to hardware capacity limitations.

The second storage 121 may be a memory configured to store the acquired high-frequency component. The second storage 121 may be implemented with memories having various sizes according to various exemplary embodiments. For example, when all the high-frequency components corresponding to the pixel values of the input image are acquired and stored and then applied to the input image, the second storage 121 may be implemented to have a size equal to or larger than the size of the input image. In another example, when the high-frequency components are applied in image units corresponding to the size of the first storage 120 or the high-frequency components acquired in pixel lines are applied in pixel line units, the second storage 121 may be implemented to have a size suitable for the corresponding image processing.

The third storage 122 may be a memory in which an output image image-processed by applying the acquired high-frequency components is stored and may be implemented with memories having various sizes according to various exemplary embodiments. For example, when the output image is acquired and displayed by applying all the high-frequency components corresponding to the pixel values of the input image according to an exemplary embodiment, the third storage 122 may be implemented to have a size equal to or larger than the size of the input image. In another example, when the image is output in image units corresponding to the size of the first storage 120 or the image is output in pixel line units, the third storage 122 may be implemented to have a size suitable for the corresponding image storage.

When the output image is overwritten in the first storage 120 or the second storage 121 or when the output image is not stored but is directly displayed, the third storage 122 may be unnecessary.

The output interface 150 may output an audio signal.

The output interface 150 may convert the digital audio signal processed in the processor 140 to an analog audio signal and amplify and output the analog audio signal. For example, the output interface 150 may include at least one speaker, a digital to analog (D/A) converter, an audio amplifier, and the like which may output at least one channel. For example, the output interface 150 may include an L channel speaker and an R channel speaker which reproduce an L channel and an R channel. However, this is not limited thereto and the output interface 150 may be implemented in various forms. In another example, the output interface 150 may be implemented in a sound bar form which reproduces the L channel, the R channel, and the center channel.

Figure 11:
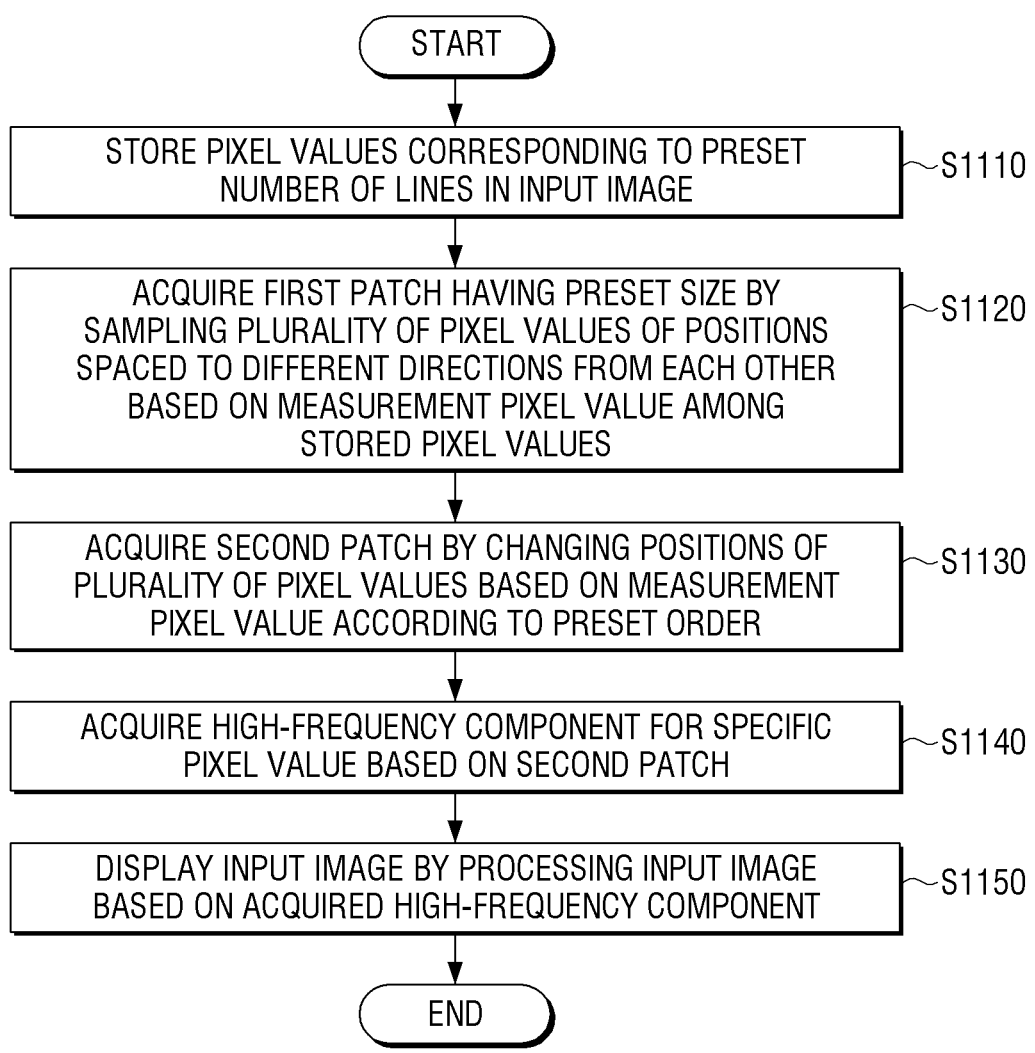
FIG. 11 is a flowchart illustrating an image processing method of a display apparatus according to an embodiment.
Figure 12:
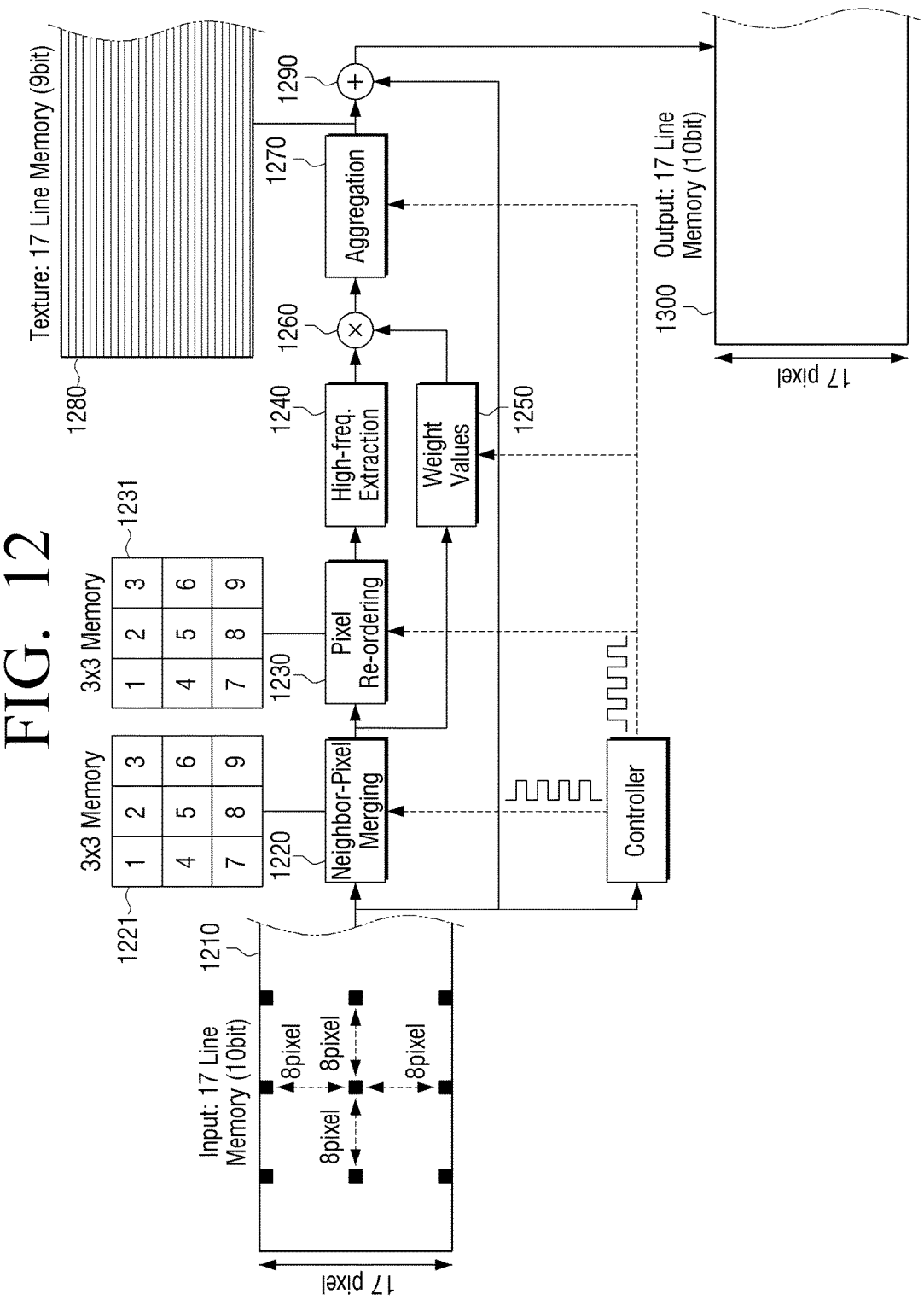
FIG. 12 is a diagram illustrating an image processing method of a display apparatus according to an embodiment.

FIG. 11 is a flowchart illustrating an image processing method of a display apparatus according to an exemplary embodiment and FIG. 12 is a diagram illustrating an image processing method of a display apparatus according to an exemplary embodiment.

According to an image processing method of a display apparatus according to an exemplary embodiment illustrated in FIG. 11, the processor may store pixel values corresponding to the predetermined number of lines in an input image (S1110). For example, as illustrated in FIG. 12, the processor may store pixel values corresponding to 17 lines in a vertical direction (1210).

The processor may acquire a first patch of a predetermined size by sampling a plurality of pixels of positions spaced apart in different directions from each other based on a specific pixel value from among the stored pixel values (S1120). For example, the processor may acquire the first patch having the predetermined size by sampling a plurality of pixel values located in an outer region of the matrix based on the a specific pixel value among the stored pixel values. In this example, the processor may acquire the first patch of a 3*3 form that the specific pixel value is surrounded with pixel values located at vertexes of a quadrangle circumscribed about a circle with a pixel interval predetermined based on the specific pixel value as a radius and pixel values located at contact points between the circle and the quadrangle. As illustrated in FIG. 12, a first patch 1221 may be acquired by merging pixel values in locations spaced apart by 8 pixels from a specific pixel value in the up, down, left, and right directions and pixel values located in diagonal directions.

The processor may acquire a second patch by changing the positions of the plurality of pixel values included in the first patch based on the specific pixel value according to a predetermined order (S1130). The processor may acquire the second patch by fixing a position of the specific pixel value in the first patch and sequentially arranging pixel values spaced apart from each other based on the specific pixel value. For example, the processor may acquire the second patch by acquiring neighboring pixel values located in diagonal directions based on the specific pixel value in the first patch in one direction from among the clockwise and counterclockwise directions and may sequentially arrange the neighboring pixel values, and may acquire the remaining pixel values in the same direction as the one direction and may sequentially arrange the remaining pixel values. In this example, the processor may acquire a second patch 1231 by reordering the positions of the plurality of pixel values in a form illustrated in FIG. 12 (1230).

The processor may acquire a high-frequency component for the specific pixel value based on the second patch (S1140) and may process the input image based on the acquired high-frequency component and display the processed image (S1150). For example, the processor may acquire weight values for a plurality of pixel values adjacent to the specific pixel value based on differences between the specific pixel value in the first pixel and the plurality of pixel values and acquire the high-frequency component for the specific pixel value by applying a weight value of a corresponding position among the acquired weight values to each of high-frequency components included in a third patch.

As illustrated in FIG. 12, the processor may acquire the high-frequency component based on the second patch and the blurring-processed second patch (1240), may acquire weight values from the first patch (1250), and may acquire weight-applied frequency components by applying the weight values to the acquire high-frequency components (1260). The processor may continuously add the high-frequency components in such a manner that the center of the third patch of a 3*3 form corresponds to a current pixel position (1270). Through the above-described process, the processor may acquire a high-frequency map (1280) for pixel values corresponding to 17 lines.

The processor may acquire an image-processed output image (1300) by applying the acquired high-frequency map to the input image (1290).

Figure 13A:
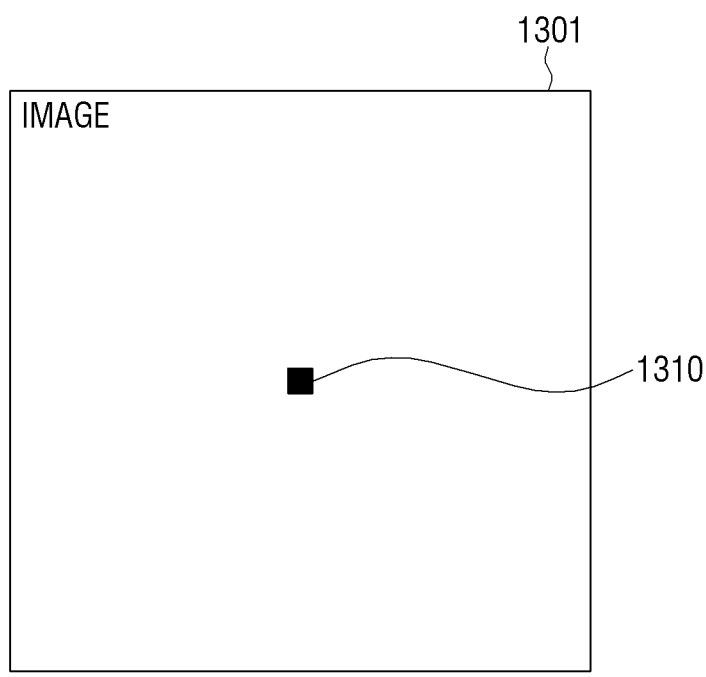
FIGS. 13A to 13C are diagrams illustrating an infringement detection method according to an embodiment.
Figure 13B:
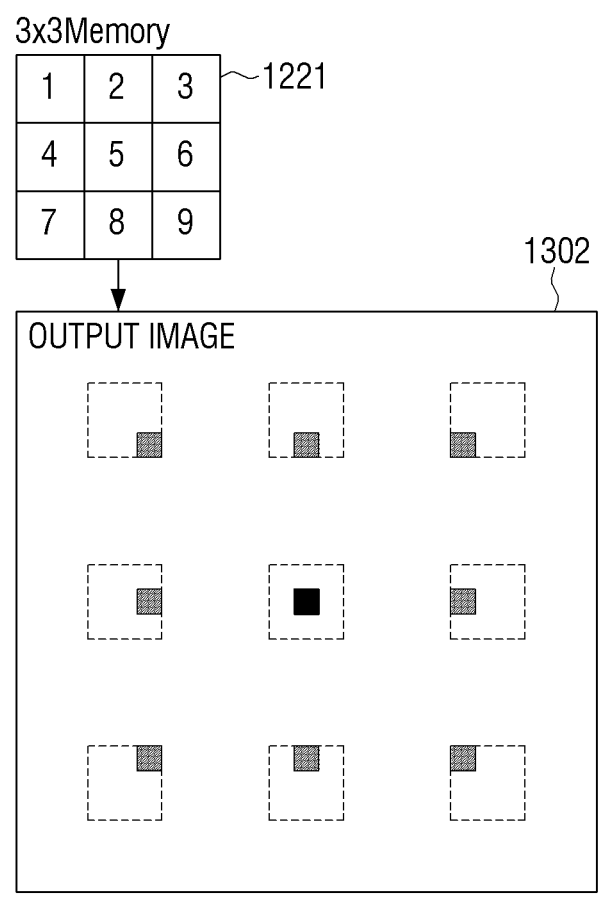
Figure 13C:
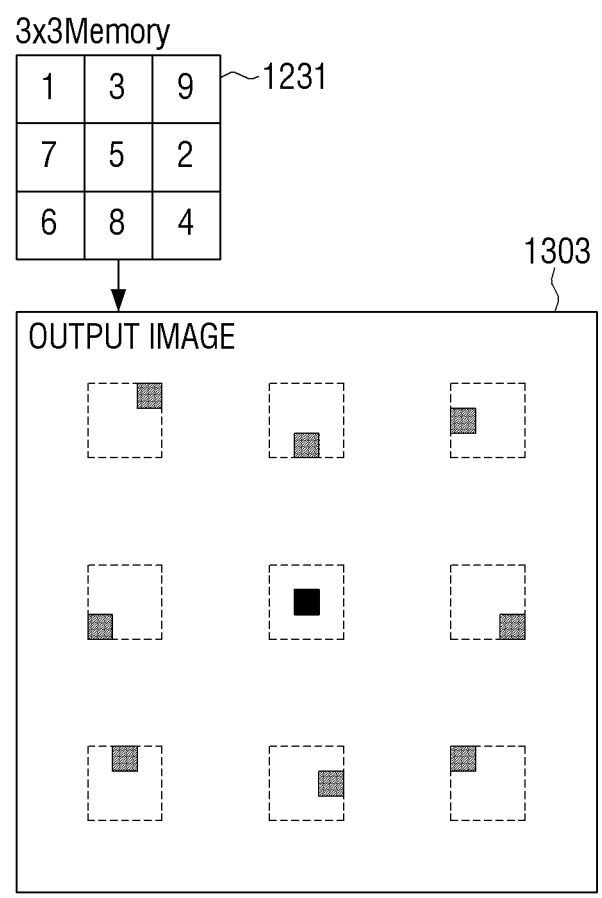

FIGS. 13A to 13C are diagrams illustrating an infringement detection method according to an exemplary embodiment.

As illustrated in FIG. 13A, the processor may determine whether or not to apply the image processing method of a display apparatus according to an exemplary embodiment by inputting a specific pattern image (for example, a black dot 1310 image 1301 having one pixel size).

According to an exemplary embodiment, the output image 1302 may have a form as illustrated in FIG. 13B when the image processing is performed by acquiring the high-frequency components based on the first patch 300-1 illustrated in FIG. 3, for example, the patch before pixel value reordering.

Figure 14A:
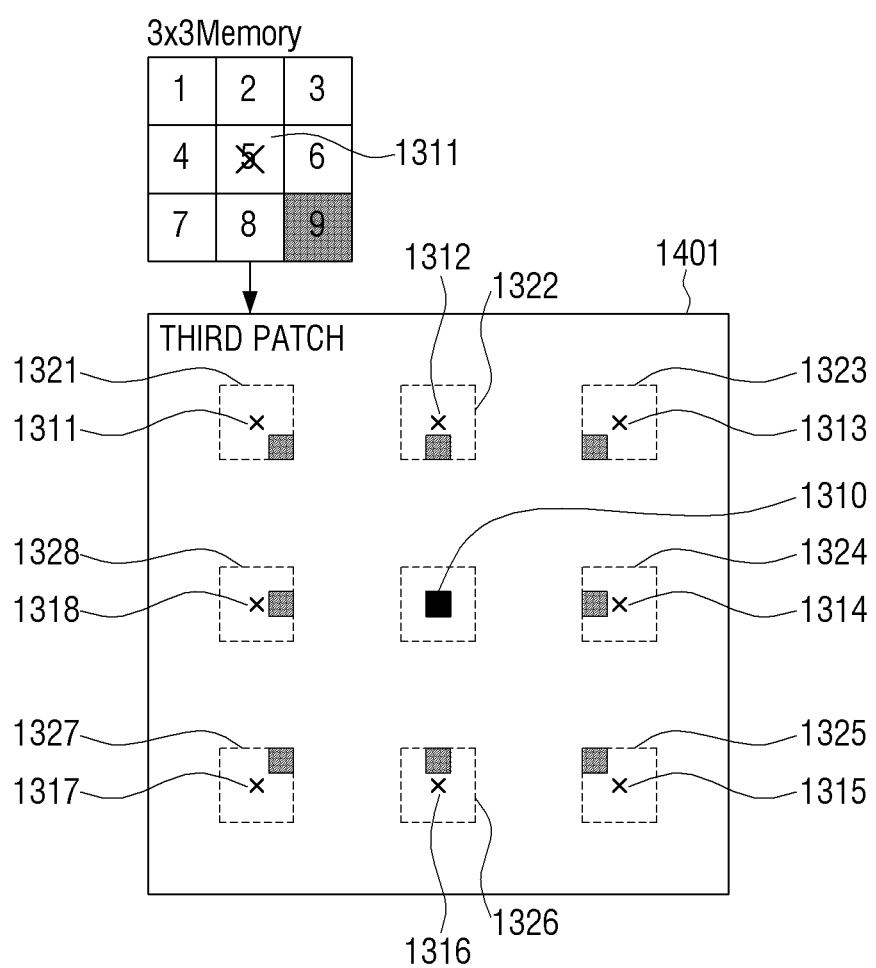
FIGS. 14A and 14B are diagrams illustrating an infringement detection method according to an embodiment.

This is because a black dot 1310 affects generation of the high-frequency components of pixels 1312, 1314, 1316, and 1318 spaced apart to the up, down, left, and right directions and the pixels 1311, 1313, 1315, and 1317 spaced apart to the diagonal directions, for example, the third patch 1401 (1321 to 1328) according to an exemplary embodiment, as illustrated in FIG. 14A. For example, when the high-frequency component for the pixel 1311 located in an upper left diagonal direction based on the black dot 1310, for example, the third patch 1321 is acquired, the black dot 1310 may affect the high-frequency component in a lower right diagonal direction based on the corresponding pixel 1311. In this example, the high-frequency components may be added in such a manner that the center portion of the second patch 1321 acquired based on the black dot 1310 corresponds to the corresponding pixel value 1311 and thus the output image 1302 may have a form including a dot in the lower right diagonal direction of the corresponding pixel 1311, as illustrated in FIG. 14A. The same principle may be applied to the remaining pixels 1312 to 1318 and thus the output image 1302 may have the same form as the form illustrated in FIG. 13B.

According to another exemplary embodiment, the output image 1303 may have a form as illustrated in FIG. 13C when the image is processed by acquiring the high-frequency components based on the second patch 400-1 illustrated in FIG. 4A, for example, the patch acquired by reordering the pixel values included in the first patch 300-1.

Figure 14B:
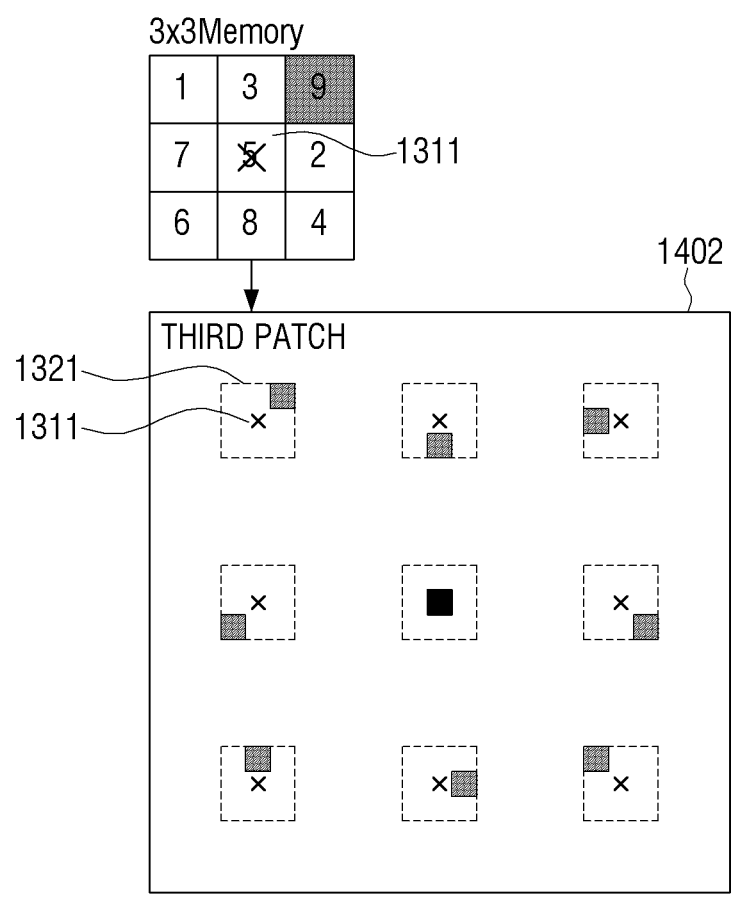

This is because when the high-frequency component for the pixel 1311 located in the upper left diagonal direction based on the black dot 1310, for example, the third patch 1321 is acquired, the black dot 1310 affects the high-frequency component in the lower right diagonal direction based on the corresponding pixel 1311 in the third patch 1321 as descried in FIG. 14A and thus the position of the corresponding high-frequency component is changed to the upper left diagonal direction through the pixel reordering. For example, high-frequency components may be added in such a manner that the center portion of the third patch 1321 acquired based on the black dot 1310 corresponds to the corresponding pixel 1311 and thus the output image 1303 may have the form including a dot in the upper right diagonal direction of the corresponding pixel 1311, as illustrated in third patch 1402 of FIG. 14B. The same principle may be applied to the remaining pixels 1312 to 1318 and thus the output image 1303 may have the form as illustrated in FIG. 13C.

According to the above-described various exemplary embodiments, the fineness of the image may be improved through texture generation with respect to the text-lost image due to image enlargement and/or image compression and the like.

The various exemplary embodiments may be applied to the display apparatus as well as any electronic apparatus which may perform image processing such as an image receiving apparatus (a settop box), an image processing apparatus, and the like.

The above-described various exemplary embodiments may be implemented in a computer- or similar device-readable recording medium using software, hardware, or a combination thereof. In some exemplary embodiments, the exemplary embodiments described herein may be implemented with the processor 140 itself. Through the software implementation, the exemplary embodiments such as a procedure and function described herein may be implemented with separate software modules. The software modules may perform one or more functions and operations described herein.

Computer instructions for performing a processing operation of the display apparatus 100 according to the above-described various exemplary embodiments may be stored in a non-transitory computer-readable medium. The computer instructions stored in the non-transitory computer-readable medium may allow a specific apparatus to perform the processing operation in the display apparatus 100 according to the above-described exemplary embodiments when the computer instructions are executed through a processor of the specific apparatus.

The non-transitory computer-recordable medium is not a medium configured to temporarily store data such as a register, a cache, or a memory but an apparatus-readable medium configured to semi-permanently store data. Specifically, the non-transitory apparatus-readable medium may be a compact disc (CD), a digital versatile disc (DVD), a hard disc, a Blu-ray disc, a universal serial bus (USB), a memory card, a read only memory (ROM), and the like.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art. While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A display apparatus comprising:
    an input interface;
    a first storage;
    a display; and
    a processor configured to:
        control the first storage to store a plurality of pixel values corresponding to a predetermined number of lines of an image input through the input interface,
        acquire a first patch of a predetermined size by sampling a set of pixel values located in an outer region of a matrix centering around a specific pixel value from among the plurality of pixel values stored in the first storage,
        acquire a high-frequency component for the specific pixel value based on the first patch,
        process the input image based on the high-frequency component, and
        control the display to display the processed image.

2. The display apparatus as claimed in claim 1, wherein the processor is further configured to acquire a second patch by changing positions of the set of pixel values based on the specific pixel value in the first patch according to a predetermined order and wherein the processor is configured to acquire the high-frequency component for the specific pixel value based on the second patch.

3. The display apparatus as claimed in claim 2, wherein the processor is further configured to perform blurring processing on the second patch, acquires a third patch comprising the high-frequency component for the specific pixel value based on differences between a first set of pixel values included in the first patch and a second set of pixel values included in the blurring-processed second patch, and applies the acquired third patch to the specific pixel value of the input image.

4. The display apparatus as claimed in claim 3, wherein the processor is further configured to acquire weight values for a third set of pixel values adjacent to the specific pixel value based on the differences between the specific pixel value in the first patch and the third set of pixel values and acquire the high-frequency component for the specific pixel value by applying a corresponding weight value among the acquired weight values to each of high-frequency components included in the third patch.

5. The display apparatus as claimed in claim 3, wherein the processor is further configured to perform the blurring processing on a fourth set of pixel values located in a boundary region of the second patch by mirroring the fourth set of pixel values located in the boundary region of the second patch and arranging the mirrored fourth set of pixel values in an outer region of the second patch.

6. The display apparatus as claimed in claim 3, wherein the processor is further configured to adjust an average value of high-frequency components included in the third patch to a predetermined value and applies the average value-adjusted third patch to the specific pixel value of the input image.

7. The display apparatus as claimed in claim 2, wherein the processor is further configured to:
acquire the first patch having a 3*3 form that the specific pixel value is surrounded with a fifth set of pixel values located at vertexes of a quadrangle circumscribed about a circle with a pixel interval predetermined based on the specific pixel value as a radius and a sixth set of pixel values located at contact points between the circle and the quadrangle, and
acquire the second patch by fixing a position of the specific pixel value in the first patch and sequentially arranging pixel values spaced apart from each other based on the specific pixel value.

8. The display apparatus as claimed in claim 7, wherein the processor is further configured to acquire the second patch by:
acquiring neighboring pixel values, which are located in diagonal directions based on the specific pixel value in the first patch, in one direction from among clockwise and counterclockwise directions,
sequentially arranging the neighboring pixel values,
acquiring remaining pixel values in the same direction as the one direction, and
sequentially arranging the remaining pixel values.

9. The display apparatus as claimed in claim 7, wherein the first storage comprises an N-line memory corresponding to the predetermined number of lines, and
wherein the processor is further configured to acquire the first patch by sampling a plurality of second pixel values in positions spaced by (N−1)/2 pixel interval to up, down, left, and right directions based on the specific pixel value located in (N+1)/2-th line among pixel values corresponding to the N lines stored in the first storage and a plurality of first pixel values located at vertexes of a quadrangle that the plurality of second pixel values are center points of edges.

10. The display apparatus as claimed in claim 1, further comprising a second storage,
wherein, when a high-frequency component for the specific pixel value is acquired, the processor is further configured to control the second storage to store the acquired high-frequency component and to sequentially acquire and store high-frequency components for next pixels in the second storage and when high-frequency components for all pixel values included in the input image are stored in the second storage, acquire a corrected image by applying the stored high-frequency components to corresponding pixel values.

11. An image processing method of a display apparatus, the method comprising:
storing a plurality of pixel values corresponding to a predetermined number of lines of an input image;
acquiring a first patch of a predetermined size by sampling a set of pixel values from among the plurality of pixel values, located in an outer region of a matrix centering about a specific pixel value among the stored plurality of pixel values;
acquiring a high-frequency component for the specific pixel value based on the first patch;
processing the image based on the high-frequency component; and
displaying the processed image on a display of the display apparatus.

12. The method as claimed in claim 11, wherein the acquiring of the high-frequency component comprises acquiring a second patch by changing positions of the set of pixel values based on the specific pixel value in the first patch according to a predetermined order.

13. The method as claimed in claim 12, wherein the acquiring of the high-frequency component comprises performing blurring processing on the second patch and acquiring a third patch comprising the high-frequency component for the specific pixel value based on differences between a first set of pixel values in the first patch and a second set of pixel values in the blurring-processed second patch.

14. The method as claimed in claim 13, wherein the acquiring of the high-frequency component comprises acquiring the high-frequency component for the specific pixel value by acquiring weight values for a third set of pixel values adjacent to the specific pixel value based on differences between the specific pixel value in the first patch and the third set of pixel values and applying a corresponding weight value among the acquired weight values to each of high-frequency components in the third patch.

15. The method as claimed in claim 13, wherein the acquiring of the second patch comprises performing blurring processing on a fourth set of pixel values located in a boundary region of the second patch by mirroring the fourth set of pixel values located in the boundary region of the second patch and arranging the mirrored pixel values in an outer region of the second patch.

16. The method as claimed in claim 13, further comprising adjusting an average value of high-frequency components in the third patch to a predetermined value and applying the average value-adjusted third patch to the specific pixel value of the input image.

17. The method as claimed in claim 12, wherein the acquiring of the first patch comprises:
acquiring the first patch having a 3*3 form that the specific pixel value is surrounded with a fifth set of pixel values located at vertexes of a quadrangle circumscribed about a circle with a pixel interval predetermined based on the specific pixel value as a radius and a sixth set of pixel values located in contact points of the circle and the quadrangle, and
wherein the acquiring of the second patch comprises acquiring the second patch by fixing a position of the specific pixel value in the first patch and sequentially arranging a third set of pixel values spaced apart from each other based on the specific pixel value.

18. The method as claimed in claim 17, wherein the acquiring of the second patch comprises acquiring the second patch by:
acquiring neighboring pixel values located in diagonal directions based on the specific pixel value in the first patch in one direction from among clockwise and counterclockwise directions,
sequentially arranging the neighboring pixel values,
acquiring remaining pixel values in the same direction as the one direction, and
sequentially arranging the remaining pixel values.

19. The method as claimed in claim 17, wherein the display apparatus comprises an N-line memory which corresponds to and stores the predetermined number of lines, and
wherein the acquiring of the first patch comprises acquiring the first patch by sampling a plurality of second pixel values in positions spaced by a (N−1)/2 pixel interval in up, down, left, and right directions based on the specific pixel value located in (N+1)/2-th line from among the plurality of pixel values corresponding to the N lines stored in the memory and a plurality of first pixel values located at vertexes of a quadrangle that the plurality of second pixel values are center points of edges.

20. A non-transitory computer-readable recording medium which stores computer instructions which allow an electronic apparatus to perform an operation when the computer instructions are executed through a processor of the electronic apparatus, the operation comprising:
- storing a plurality of pixel values corresponding to a predetermined number of lines in an input image;
- acquiring a first patch of a predetermined size by sampling a set of pixel values located in an outer region of a matrix centering about a specific pixel value from among the stored plurality of pixel values;
- acquiring a high-frequency component for the specific pixel value based on the first patch;
- processing the image based on the high-frequency component; and
- displaying the processed image.

* * * * *